2,816,018
PROCESS FOR THE PRODUCTION OF STEEL FROM HIGH PHOSPHORUS PIG IRON

Karl Ziegler, Maxhutte-Haidoff-Oberfalz, Germany

No Drawing. Application April 26, 1955, Serial No. 504,119

3 Claims. (Cl. 75—60)

The processes so far available for converting Thomas pig iron into steel are the pig iron-ore process and the Thomas steel process.

It is known that the quality of the steel blown in the normal Thomas converter process is inferior to that produced in a Siemens-Martin furnace, more especially as regards its content of phosphorus, nitrogen and slag, which is apparent quite generally from a lowering of the quality.

Numerous processes have been disclosed for making the quality of Thomas steel equal or substantially equal to that of Siemens-Martin steel. Among these processes, there are to be particularly mentioned the refining process with an increased oxygen concentration of the blast air in a wide variety of forms and the top blowing process which operates with pure oxygen.

The problem which the top blowing process with oxygen has to solve is twofold; firstly, the absorption of nitrogen is to be prevented by the use of pure oxygen, and secondly the heat consumption of the process is to be made more economic by eliminating the nitrogen charge, in that the heat quantity removed by the nitrogen is made available for melting down scrap iron or ore.

The use of pure oxygen presupposes that the dephosphorisation is carried out while carbon is still present, so that movement of the bath is ensured by the carbon monoxide being formed with the oxidation of the carbon, which movement counteracts an excessive iron slagging which would occur if phosphorus had to be oxidised without carbon being present at the same time.

The problem of the top blowing process therefore consists in terminating the dephosphorisation with a highest possible carbon content.

However, the conditions which are necessary in order to be able to produce an early dephosphorisation are: a low bath temperature and a liquid reactive slag which has a high lime and ferrous oxide content.

When using the formerly known blowing processes, this slag had to be formed by the oxygen which is blown in, by burning silicon and above all carbon. A part of the carbon therefore had to be already burnt before dephosphorisation could take place.

This formerly necessary operation, i. e. formation of a reactive slag by partial combustion of carbon and also completion of the dephosphorisation before decarbonisation is completed, cannot be carried out with sufficient reliability in operation.

In order to achieve the necessary reliability in operation, a process is proposed in which the process must definitely commence with the dephosphorisation and the decarbonisation is only the second step of the reaction.

The process is characterised in that only a part of the prepared melt is tapped off free from slag, and pig iron containing phosphorus, more especially Thomas pig iron, is introduced into the residual melt consisting of steel and slag.

In carrying the invention into effect, the procedure is that before the Thomas pig iron is added to the residual melt, the amount of slag is increased by adding lime and oxide carriers (such as iron ore, mill scale, and similar substances). By top blowing oxygen on to the bath, the slag formers which are added are melted by the heat being thereby liberated, so that the iron bath and the slag are heated and at the same time the oxygen content of the residual bath is increased.

It is advisable to choose such a value for the bath residue that it amounts to at least 15% of the weight of the total melt so that the converter is at no time completely emptied during a period of several meltings.

Upon introducing the Thomas pig iron into the superheated residual melt, the oxygen present in the bath instantly initiates the oxidation process, particularly of the phosphorus, and the phosphorus oxide which is formed may be taken up by the strongly reactive slag which is already present.

Due to the association of the Thomas pig iron with the finally blown steel, the carbon content of the total melt is in addition lowered to below a limit of about 2.5%. When top blowing with oxygen, a carbon content of 2.5% certainly leads in every case to an immediate reaction between oxygen and carbon.

The bath residue has therefore initiated the phosphorus reaction and has also reliably ensured the course of the decarbonisation reaction. Both reactions may now be controlled as necessary by means of the supply of oxygen.

When the phosphorus content of the bath has dropped to about 0.1% it is advisable to remove the slag which has formed and this slag may be used as Thomas meal. By addition of lime and possibly oxide carriers, a new slag is formed under which the process is continued and completed.

The process enables the excess heat to be made available either by remelting scrap iron or converting ore into steel. The amount of scrap to be melted or the amount of ore to be converted is higher in relation to the formerly known processes, since only a part of the slag has to be formed afresh with each melt and thus it is possible to save part of the heat for the slag-forming operation.

Even when the carbon contents are high, the process supplies phosphorus values which enable the melts to be tapped with the required carbon content in the manner known in connection with the Siemens-Martin furnace process. The process is suitable for producing both hard and soft steels with a quality equal or substantially equal to those obtained by the Siemens-Martin process.

I claim:

1. Process for the production of steel from pig iron containing phosphorus, which comprises top blowing said pig iron in a converter with oxygen, tapping a part of the prepared melt as far as possible free from slag, introducing into the residual melt consisting of steel and slag, pig iron containing phosphorus, the converter never being completely emptied during a period of several meltings.

2. Process according to claim 1, wherein the amount of slag is increased by adding lime and oxide carriers prior to said pig iron containing phosphorus being added to the residual melt, and by blowing oxygen on to and above all at the residual melt, the slag formers are melted, the residual melt and the slag is superheated and at the same time the oxygen content of the residual bath is increased.

3. Process according to claim 1, wherein the bath residue must amount to at least 15% of the weight of the quantity of pig iron to be poured in.

References Cited in the file of this patent

UNITED STATES PATENTS

| | | |
|---|---|---|
| 1,080,606 | Thiel | Dec. 9, 1913 |
| 1,162,755 | Dinkey | Dec. 7, 1915 |
| 2,501,832 | Story | Mar. 28, 1950 |